Aug. 21, 1928.
E. B. FEASTER ET AL
1,681,764
SPINDLE
Filed Dec. 31, 1926
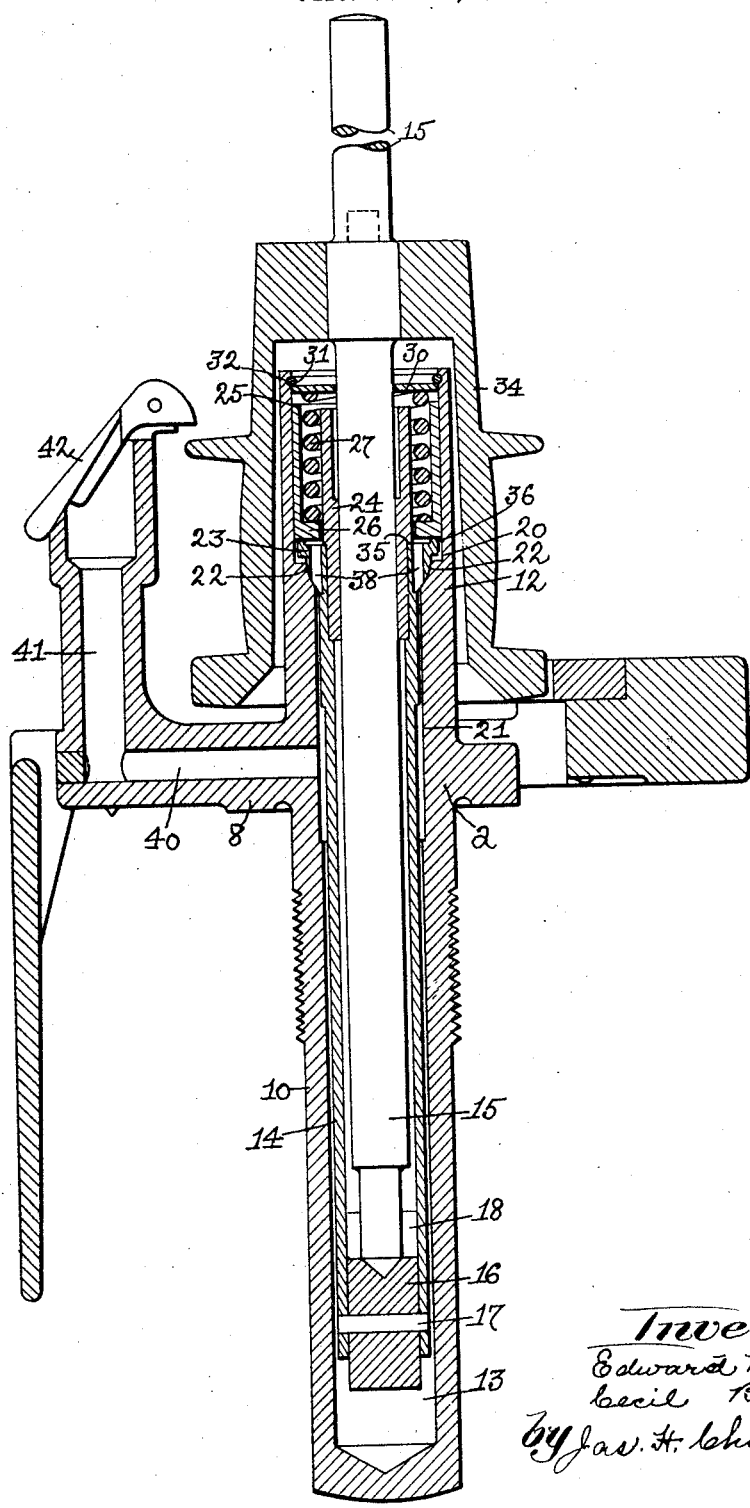
Inventors.
Edward B. Feaster
Cecil B. Almy
by Jas. H. Churchill
atty.

Patented Aug. 21, 1928.

1,681,764

UNITED STATES PATENT OFFICE.

EDWARD B. FEASTER, OF LOWELL, AND CECIL B. ALMY, OF MARBLEHEAD, MASSACHUSETTS, ASSIGNORS TO SACO-LOWELL SHOPS, OF NEWTON UPPER FALLS, MASSACHUSETTS, A CORPORATION OF MASSACHUSETTS.

SPINDLE.

Application filed December 31, 1926. Serial No. 158,343.

This invention relates to spindles of the type used in spinning and twisting frames and particularly to spindles of the type in which the spindle is provided with a ball and socket bearing whose members are frictionally engaged by a spring under a substantial initial compression, and which spindle is stepped at its lower end in a bearing member carried by the spindle bolster which is located in an oil well formed in the bolster housing.

The present invention has for its object to provide a simple and efficient construction having the characteristics of the spindle referred to, and additional characteristics, as will be described.

To this end, the ball and socket members of the ball and socket bearing for the bolster are attached to the bolster and its housing respectively with the ball member uppermost, and the spring is located above the ball member and exerts a downward pressure upon said ball member.

The spring is preferably located in a sleeve slidable in the bolster housing and bearing against the ball member.

Means are provided for initially compressing the spring and for retaining it in the bolster housing under such compression.

The ball member is preferably provided with an opening extended through it for the passage of oil to the concaved surface of the socket member, for lubricating the ball and socket bearing.

These and other features of this invention will be pointed out in the claims at the end of this specification.

The drawing represents in vertical central section a spindle embodying this invention.

Referring to the drawing a represents the bolster housing provided with a base 8, below which is extended a tubular lower portion 10 of substantial length, and above which is extended a tubular upper portion 12 open at its upper end.

The base 8 is designed to rest upon the spindle or ladder rail of a spinning and twisting frame, not shown, and is secured thereto by a nut, not shown, which engages a threaded portion of the lower portion 10.

The lower portion 10 is made of substantial length and is closed at its bottom to form an oil well 13 into which is extended the lower end of a bolster 14 for the spindle blade 15, which is stepped at its lower end in a bearing member 16 located in the lower end of the bolster and secured thereto by a pin 17 or otherwise.

The bolster 14 is provided with an opening 18 for the passage into it of oil in the oil well.

The bolster housing a is provided at its upper end with a bore or chamber 20 of larger diameter than the bore 21 of the main portion of the bolster housing, and the inner wall of the bore 21 adjacent the enlarged bore or chamber 20 has formed in it a substantially semi-spherical shaped concavity 22, which forms a socket member for a ball and socket bearing for the spindle bolster 14, the ball member 23 of which bearing is affixed to or formed on the bolster 14 and extends upwardly into the chamber 20.

The spindle bolster 14 is provided with an extension 24 forming a cylindrical bearing member for the spindle blade 15 within the bolster housing.

The ball member 23 has co-operating with it a sleeve 25 slidable in the chamber 20 and provided with an inwardly extended bottom flange 26 upon which rests the lower end of a helical spring 27, which is placed under an initial compression sufficiently heavy to force the ball member 23 into engagement with its socket member 22 and to maintain it against tilting movement with relation to said socket member under normal conditions of use, but which permits the spindle bolster and its spindle to oscillate under abnormal conditions of use as will be described.

The spring 27 is placed under the desired initial compression by a suitable tool, not shown, in the hand of the operator, which is pressed against a washer 30 located in the chamber 20 and retained therein in any suitable manner as by a split ring 31 which is entered into an annular groove 32 in the inner wall of the chamber 20.

The spindle blade has frictionally or otherwise secured thereon a whirl 34, whose horizontal center is in a plane in close proximity to a horizontal plane through the center of the ball member 23.

The ball member 23 is substantially semi-spherical in shape and is provided with a substantially flat upper surface 35 and an annular flange or lip 36, which projects slightly above the surface 35 and against which the sleeve 25 is forced by the spring 27.

The ball member 23 is provided with a plurality of openings 38 extended through it from its substantially flat upper surface 35 to its curved lower surface, for the passage of oil from within the sleeve 25 down to the contacting surfaces of the ball and socket members to efficiently lubricate the latter.

The washer 30 is fitted closely on the spindle blade and serves to arrest upward movement of the oil from the oil well along the spindle blade, and cause it to pass into the sleeve 25 from which it is returned to the oil well through the openings 38 in the ball member 23, which openings are of such size and so arranged as to directly communicate for a portion of their width, with the sleeve 25 and the oil well.

The spring 27 is placed under an initial pressure sufficiently great to create sufficient friction between the ball and socket members of the bolster to restrain the latter from rotating when supporting a balanced load and to initially resist and substantially overcome lateral tipping and gyratory motion of said bolster when carrying an unbalanced load.

For a light or medium weight type of spindle, such as hereinshown, the initial compression of the spring 27 is such as to exert a pressure from 20 to 25 pounds upon the ball member, but the amount of pressure used will vary with the type of spindle a heavy spindle requiring a greater pressure.

From the above description, it will be observed that a simple and highly efficient spindle is provided, which is capable of handling balanced and unbalanced loads, which is relatively inexpensive to manufacture, and which can be assembled in a minimum time and with a minimum effort.

It will be observed that the bolster housing is open at its upper end for the insertion and removal of the spindle bolster, and for the reception of a suitable tool by which the socket member 22 is formed in the inner wall of said housing.

The base 8 is provided with an oil passage 40 connecting the oil well 13 with a hollow upright 41, whose upper end is closed by a cap or cover 42.

It will also be observed that the tubular portion 10 forming the oil well is extended a substantial distance below the base 8, and that the bolster 14 is extended to near the bottom of said oil well and is of smaller diameter so as to be laterally movable therein with the the ball and socket bearing as a center, and that the spindle blade is stepped in a fixed bearing near the lower end of the bolster, whereby the latter is suspended at its upper end and swings with the ball member as a center under the influence of an unbalanced load.

It will also be observed that the bolster and its co-operating parts are insertible into and removable from the bolster housing through the upper end thereof.

What is claimed is:

1. In a spindle, in combination, a bolster housing open at its upper end and closed at its lower end to form an oil well and having its inner wall provided with a concavity forming a socket member opening upwardly, a bolster for the spindle blade provided with a ball member co-operating with said socket member, a sleeve located in said housing above said ball member, a spring located in said housing above the ball member and within said sleeve and co-operating with the latter to move it in the housing in the direction of the length thereof and effect a direct thrust of the ball member against its socket member, and means for initially compressing said spring and for retaining it in its initially compressed condition under normal conditions of use.

2. In a spindle, in combination, a bolster housing open at its upper end and closed at its lower end to form an oil well and having its inner wall provided with a concavity forming a socket member opening upwardly, a bolster for the spindle blade provided with a ball member co-operating with said socket member and provided with an opening extended through it for the passage of oil to the concavity in said socket member, a sleeve located in said housing above said ball member and having an inwardly extended bottom flange, a spring located in said housing above said ball member and having its lower end engaged with the bottom flange of said sleeve to move the latter in said housing and effect a direct thrust of the ball member against its socket member, and means for initially compressing said spring and for retaining it in its initially compressed condition under normal conditions of use.

3. In a spindle, in combination, a bolster housing having a base provided with a lower tubular portion extended downward therefrom to form an oil well, and having an upwardly extended tubular portion open at its upper end and provided within it with a rigid socket member opening upwardly, a bolster for the spindle blade insertible into said housing through said upper tubular member and having its lower end extended into said oil well, a ball member attached to said bolster above the rigid socket member and co-operating with the latter to suspend the bolster within said upper tubular member by a ball and socket bearing, a spring located within said upper tubular member above the ball member and under substantial initial compression to force the ball member into firm contact with its co-operating rigid socket member, and means co-operating with said upper tubular member for retaining said spring in its initially compressed condition.

4. In a spindle, in combination, a bolster housing having a base provided with a lower tubular portion extended downward therefrom and closed at its lower end to form an oil well, and having an upwardly extended tubular portion having bores of different diameters with the bore of smaller diameter below the bore of larger diameter and having its inner wall adjacent the bore of larger diameter provided with a substantially semi-spherical shaped concavity forming a rigid socket member, a bolster for the spindle blade insertible into said housing through the bore of larger diameter and having its lower end extended into said oil well, a ball member attached to said bolster above said socket member and conforming to the concavity of the latter, a spring in the bore of larger diameter above said ball member and initially compressed a substantial amount to hold the ball member in firm contact with said socket member, and means co-operating with the upper tubular member to retain the said spring in its initially compressed condition.

In testimony whereof, we have signed our names to this specification.

CECIL B. ALMY.
EDWARD B. FEASTER.